UNITED STATES PATENT OFFICE.

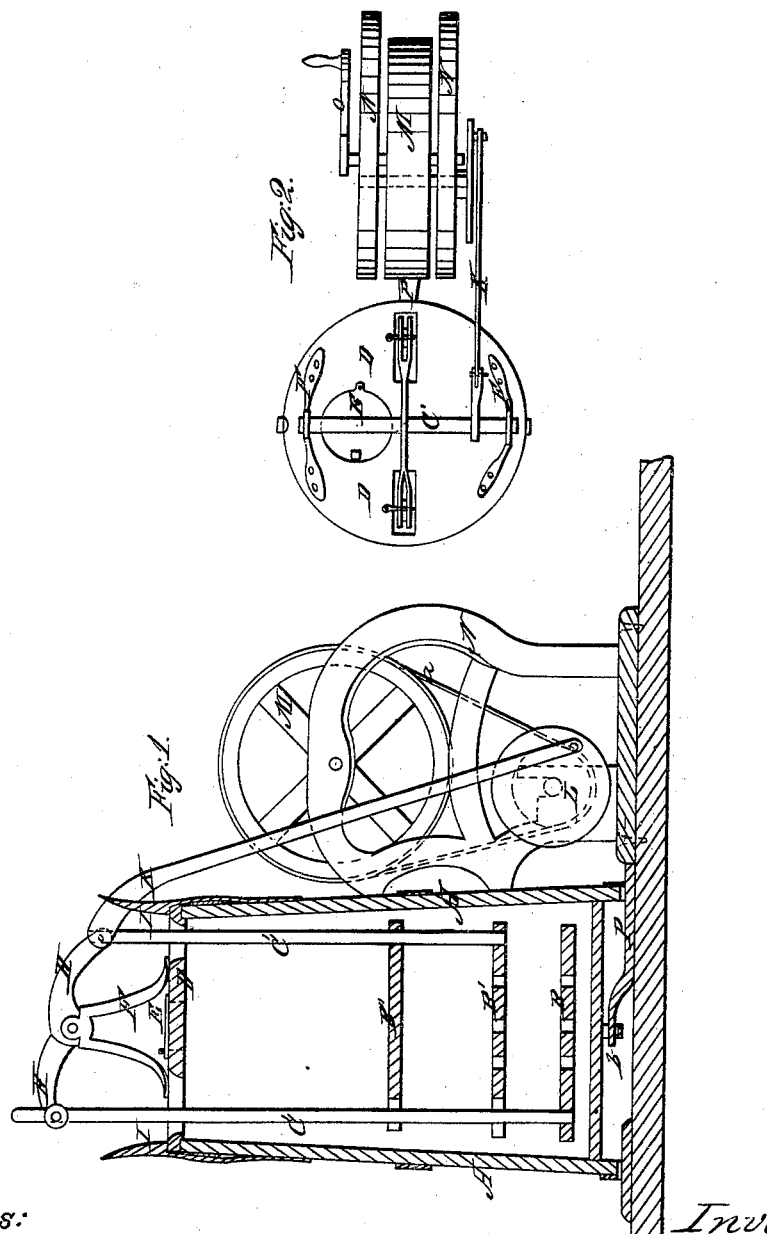

AUGUST KÖHLER AND MICHAEL W. WILSON, OF NOBLESVILLE, INDIANA.

Letters Patent No. 86,083, dated January 19, 1869.

IMPROVEMENT IN CHURNS.

The Schedule referred to in these Letters Patent and making part of the same.

*To all whom it may concern:*

Be it known that we, AUGUST KÖHLER and MICHAEL W. WILSON, of Noblesville, in the county of Hamilton, and State of Indiana, have invented a new and useful Improvement in Churns; and we do hereby declare that the following is a full, clear, and exact description of the same, reference being had to the annexed drawings, making part of this specification, in which—

Figure 1 is a view of the churn, and the mechanism which operates it, partly in section and partly in elevation, the churn being shown in section through its centre, while the mechanism is shown in elevation.

Figure 2 is a top view of the churn and its operating-mechanism.

Corresponding letters refer to corresponding parts in both figures.

The object of this invention is an improvement in churns; and

It consists in the arrangement of a series of dashers within the churn.

It further consists of a device for holding said churn to the platform upon which it rests when in operation, and in the arrangement of the mechanism by which it is operated.

A is the barrel or vessel which contains the cream or milk to be churned, which is constructed of staves, heads, and hoops, in the usual manner.

B, B', and B" are a series of dashers or agitators, consisting of disks of wood, arranged upon the rods C C', within the barrel, the one, B, being attached to the rod C, while B' and B" are attached to rod C'.

The two lower dashers, B and B', are perforated, for the purpose of more thoroughly agitating the cream, as they pass up and down therein, while the upper one, B", is a disk, without perforations, except those through which the rods C and C' pass; the object of the dasher being to create additional agitation of the contents of the churn, and to prevent said contents from being forced into the upper part of the barrel by the compressing-action of the other two dashers, as they are moved up and down or toward and from each other by the movements of the double-thrown lever H H, on the top of the churn.

C C' are the rods which connect the dashers with the lever H, which operates them, and they are made of wood, and pass through perforations in the upper head of the churn.

D is the upper head of the barrel A, which is held in position by means of the spring-hasps I I attached to the sides of said barrel, as shown in fig. 1 of the drawings, said head being provided with an aperture in its surface, for the introduction of the cream or milk to the churn, which aperture is closed by the swinging cover E.

F F are stands, secured to the head D, in which the ends of shaft G rest, and in which they turn.

H H represent a lever, which is attached to the shaft G, one arm of which extends from one side of said shaft, and the other from the opposite side thereof, the outer ends of such lever being connected respectively to the dasher and rods C C', as above stated.

K is a connecting-rod, which, at its upper end, is connected to one of the arms H, while it extends downward, and has its opposite or lower end connected to a pin in the pulley L, by which motion is imparted to said rod K, and, through it, to levers H H and dashers B, B', and B".

L is a pulley, which is secured to a shaft which has its bearings in the frame-work N, and around which the belt *a* passes from pulley M.

M is another and a larger pulley, which is also placed upon a shaft having its bearings in the frame-work N, said shaft having upon one of its ends, and outside of N, a crank, O, for turning the same, and thereby imparting motion to the pulley M, and by it to the other parts, as above described.

The arrangement of the parts, above referred to, is clearly shown in the drawings, and hence, need not be more particularly described here.

The means of attaching and detaching the lever H H from the rods C C' and from the rod K, for facilitating the removal of the cover or head D from the churn, when it becomes necessary, are also clearly shown, and they consist of pins passed through ears formed upon said lever and connecting-rod, and through the rods C C', which pins may be prevented from falling out by having a hole drilled through them, and inserting therein a strip of leather, or it may be done by any other of the well-known means for producing such effect.

P is a bar or plate of iron, secured to the platform upon which the churn rests, having its outer end raised to a height sufficient to permit to embrace a stud, *b*, which is secured to the bottom of the churn.

The bar or plate before referred to, has, in its outer end, a slot cut in the centre thereof, so that, as the churn or barrel is slid toward the open end of such slot, the portions of said bar which extend out over the sides of such slot will enter a groove formed in the stud *b*, which is firmly secured to the bottom head of the barrel, and thus the parts of the churn will be held in their proper position with reference to each other while in operation, but may be readily detached whenever it becomes necessary to do so for any purpose.

Having thus described our invention,

What we claim, and desire to secure by Letters Patent, is—

1. The arrangement of the dashers or agitators B, B', and B", with reference to the rods C C', substantially as and for the purpose specified.

2. The combination of the slotted bar or plate P, and the grooved stud *b*, substantially as and for the purpose specified.

3. The arrangement of the pulleys M and L, connecting-rod K, lever H H, and rods C and C', substantially as shown and described.

In testimony whereof, we have signed our names to this specification, in the presence of two subscribing witnesses.

AUGUST KÖHLER,
MICHAEL W. WILSON.

Witnesses:
WM. ARMSTRONG,
LE ROY PATTISON.